United States Patent [19]

Sugita

[11] Patent Number: 5,440,603
[45] Date of Patent: Aug. 8, 1995

[54] WATCH-DOG TIMER CIRCUIT AND A MICROCOMPUTER EQUIPPED THEREWITH

[75] Inventor: Kazuya Sugita, Itami, Japan

[73] Assignee: Mitsubishi Denki Kabushiki Kaisha, Tokyo, Japan

[21] Appl. No.: 230,457

[22] Filed: Apr. 20, 1994

[30] Foreign Application Priority Data

May 19, 1993 [JP] Japan .................. 5-116837

[51] Int. Cl.⁶ ............................. H01J 37/305
[52] U.S. Cl. .................. 377/20; 395/183.06
[58] Field of Search ............. 377/20; 371/16.3

[56] References Cited

U.S. PATENT DOCUMENTS 4,586,179 4/1986 Sirazi et al. ............. 371/16.3
4,962,352 10/1990 Ogawa ..................... 371/16.3

FOREIGN PATENT DOCUMENTS 3207120 9/1983 Germany ................. 371/16.3

Primary Examiner—Margaret Rose Wambach
Attorney, Agent, or Firm—Lowe, Price, LeBlanc & Becker

[57] ABSTRACT

A watch-dog timer circuit including a counter which counts clock pulses of a microcomputer and a timer circuit which is refreshed in every period of the clock pulse, thereby to generate a request signal to reset a CPU by means of the counter when the counter overflows or underflows, and generate a request signal to reset the CPU by means of the timer circuit when the clock pulse stops, in order to monitor both uncontrollable operation of the CPU and the stop of oscillation of the clock pulses, and the micro computer equipped with the watch-dog timer circuit.

12 Claims, 11 Drawing Sheets

WATCH-DOG TIMER CIRCUIT AND A MICROCOMPUTER EQUIPPED THEREWITH

BACKGROUND OF THE INVENTION

1. Field of the invention

The present invention relates to a watch-dog timer circuit to monitor both the uncontrollable operation of a CPU and the stop of system clock pulse oscillation, and relates to a microcomputer equipped with the watch-dog timer circuit.

2. Description of Related Art

FIG. 1 is a block circuit diagram illustrative of the construction of a microcomputer equipped with the conventional watch-dog timer circuit being incorporated therein. The microcomputer is equipped with a watch-dog timer 33 which, when a CPU 29 runs out of control due to a certain cause during execution of a program which has been read from a memory 32 via a system bus 30, detects the uncontrollable operation of the CPU 29 and sends to a reset circuit a reset request signal D thereby to reset the system.

The watch-dog timer 33 is equipped with an up-count type counter 1 which counts pulses of system clock signal P generated from a waveform oscillated by an oscillator circuit 28, and is programmed so that a clear signal C is input from the CPU 29 to clear the count before the count of the counter 1 overflows. Therefore, when the CPU 29 runs out of control to cause the counter i to overflow, the watch-dog timer circuit outputs the reset request signal D to the reset circuit. 31 to request it to reset the system. Upon receipt of the reset request signal D, the reset circuit 31 outputs a reset signal R to the CPU 29 and the input/output port 35 to reset the CPU 29 and the input/output port 35. The counter 1 may also be of down-cogent type.

However, the conventional watch-dog timer 33 has a problem of losing the system monitoring function when the oscillator circuit Z8 stops the oscillation due to an oscillation failure or an uncontrollable operation of the microcomputer, because a system clock signal P which is the counter source of the counter 1 of the watch-dog timer 33 is interrupted thereby to stop counting of the counter 1.

Even if it is attempted to reset by other means than the watch-dog timer 33, resetting operation is disabled when the oscillator circuit 28 has stopped oscillation, because operation of the reset circuit 31 is based on the system clock signal P obtained from the waveform oscillated by the oscillator circuit 28. Consequently, the input/output port 35 cannot be reset and abnormal output continues to be sent, eventually resulting in abnormal output because of stop of the oscillation of the microcomputer. While conflict of signals or the like caused by such an abnormal output may affect the entire system which uses t, he microcomputer, there has been no means of preventing such troubles.

SUMMARY OF THE INVENTION

The present invention has been conceived to solve such problems as described above, and has an objective of providing a watch-dog timer circuit which performs the system monitor function even when the oscillation of the system clock pulse stops, by monitoring the uncontrollable operation of the CPU as well as the period of the system clock pulses.

The watch-dog timer circuit according to the invention constitutes a characteristic feature of having a timer circuit which monitors the status of oscillation of the system clock pulses and a counter which monitors the uncontrollable operation of the CPU based on the count value. Therefore, while monitoring the uncontrollable operation of the CPU, the watch-dog timer circuit detects a state that the system clock pulse has stopped during a period of "L" in case a first timer circuit is not refreshed in a predetermined period of time after a falling edge of the system clock pulse. When a second timer circuit is not refreshed in a predetermined period of time after a rising edge of the system clock pulse, it detects a state that the system clock pulse stopped during a period of H. When either the first or the second timer circuit detects the stop of the system clock pulse, the watch-dog timer asserts the reset signal and monitors the stop of the oscillation of the system clock pulse.

The watch-dog timer circuit according to the invention constitutes a characteristic feature of having, in addition to the watch-dog timer circuit having the counter, and the first and the second timer circuits described above, a circuit which receives an input signal inhibiting the assertion of the reset signal and accordingly does not assert the reset signal, even when interruption of the oscillation of the system clock pulse is detected. Therefore, when it is not necessary to reset at the time of oscillation stop in such a case as the non-talking period of a portable telephone wherein the oscillation of the system clock pulses is stopped under the STP command to save the power consumption, for example, reset., signal is not asserted even when the oscillation of the system clock pulses is stopped.

Another objective of the invention is to provide a microcomputer which improves the reliability of the system which employs the micro computer, by interrupting the output to external devices connected to the microcomputer in the case of a trouble of the microcomputer and further informing the occurrence of the trouble of the microcomputer to the outside, thereby protecting the peripheral devices and other systems connected to the microcomputer.

The microcomputer of the invention constitutes a characteristic feature of having a circuit which, when the respective watch-dog timer circuits described above generate the reset request signals which assert the reset signal of the system, puts all or a part of the outputs to the output terminals in the floating status and inhibits the output. Consequently, even in the case of uncontrollable operation of the CPU or when the system clock stops oscillation, the watch-dog timer circuit asserts the reset signal to prevent abnormal output from being sent to the outside.

The microcomputer of the invention further constitutes a characteristic feature of having a circuit which, when the respective watch-dog timer circuits described above generate the reset request signals, locks all or a part of the outputs to the output terminals provided in an output port at "t1" or "L" state and thereby informing the occurrence of the trouble to the outside. Consequently, when the watch-dog timer circuit asserts the reset signal, all or a part of the outputs to the output terminals are locked at "H" or "L" state thereby to prevent an abnormal output from being sent to the outside and informs the occurrence of the trouble in itself to the outside.

The microcomputer of the invention further constitutes a characteristic feature of having a circuit which, when the respective watch-dog timer circuits described above generate the reset request signal, locks all or a part of the outputs to the output terminals provided in the output port selectively at "H" or "L" status and thereby informing the occurrence of the trouble to the outside. Consequently, when the watch-dog timer circuit asserts the reset signal, all or a part of the outputs to the output terminals is locked at "H" or "L" status to prevent an abnormal output from being sent to the outside and informs the occurrence of the trouble in itself to the outside.

The microcomputer of the invention further constitutes a characteristic feature of having a buffer circuit used to output the reset request signal generated by the respective watch-dog timer circuits described above of the invention to the outside, and output terminals used for the input of the reset request signal from the buffer circuit. Consequently, when the watch-dog timer circuit asserts the reset signal, it selectively informs the occurrence of troubles of the microcomputer to the external devices connected to the terminals.

The above and further objects and features of the invention will more fully be apparent from the following detailed description with accompanying drawings.

DESCRIPTION OF THE PREFERRED EMBODIMENTS

The invention will be described in detail below with reference to the drawings illustrative of preferred embodiments thereof.

Embodiment 1

Figure 1:
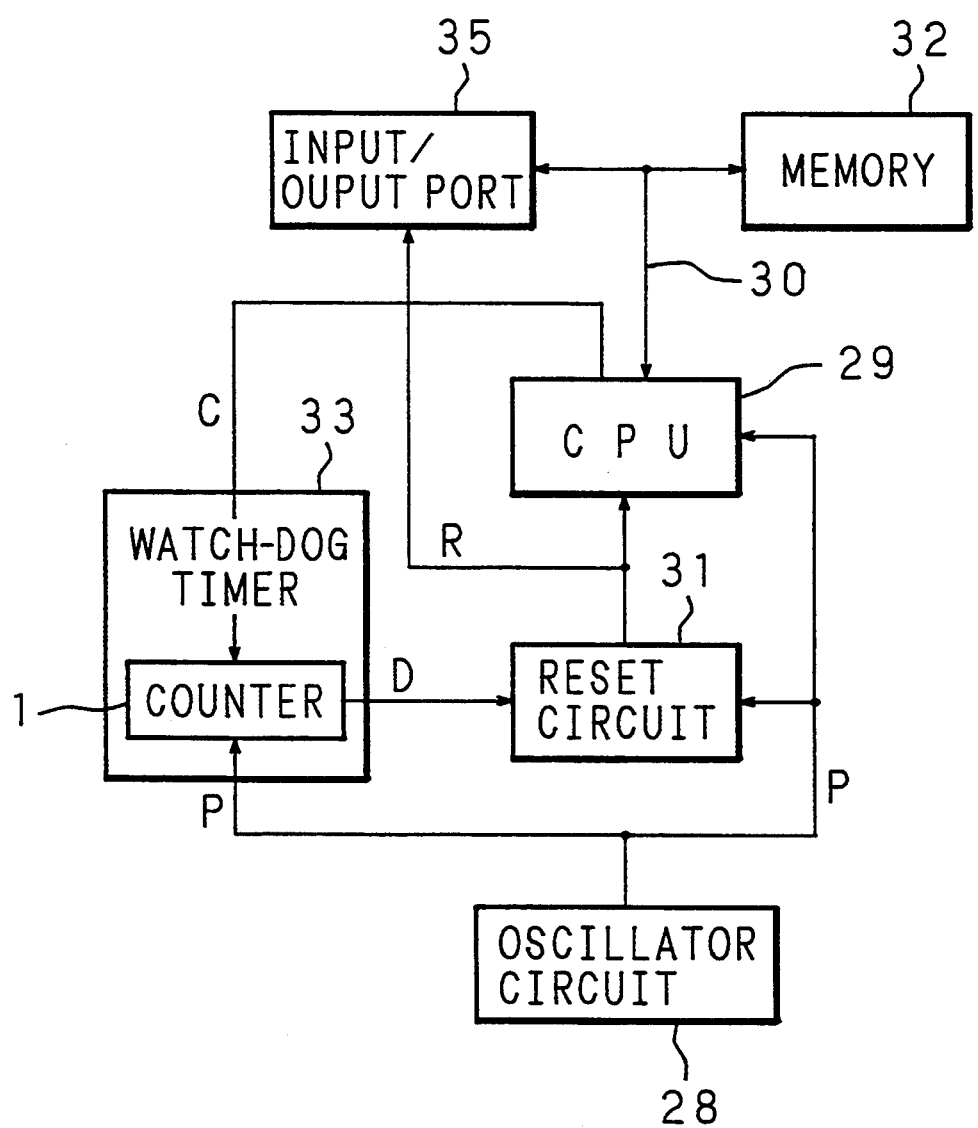
FIG. 1 is a block circuit diagram of the microcomputer equipped with the conventional watch-dog timer circuit.
Figure 2:
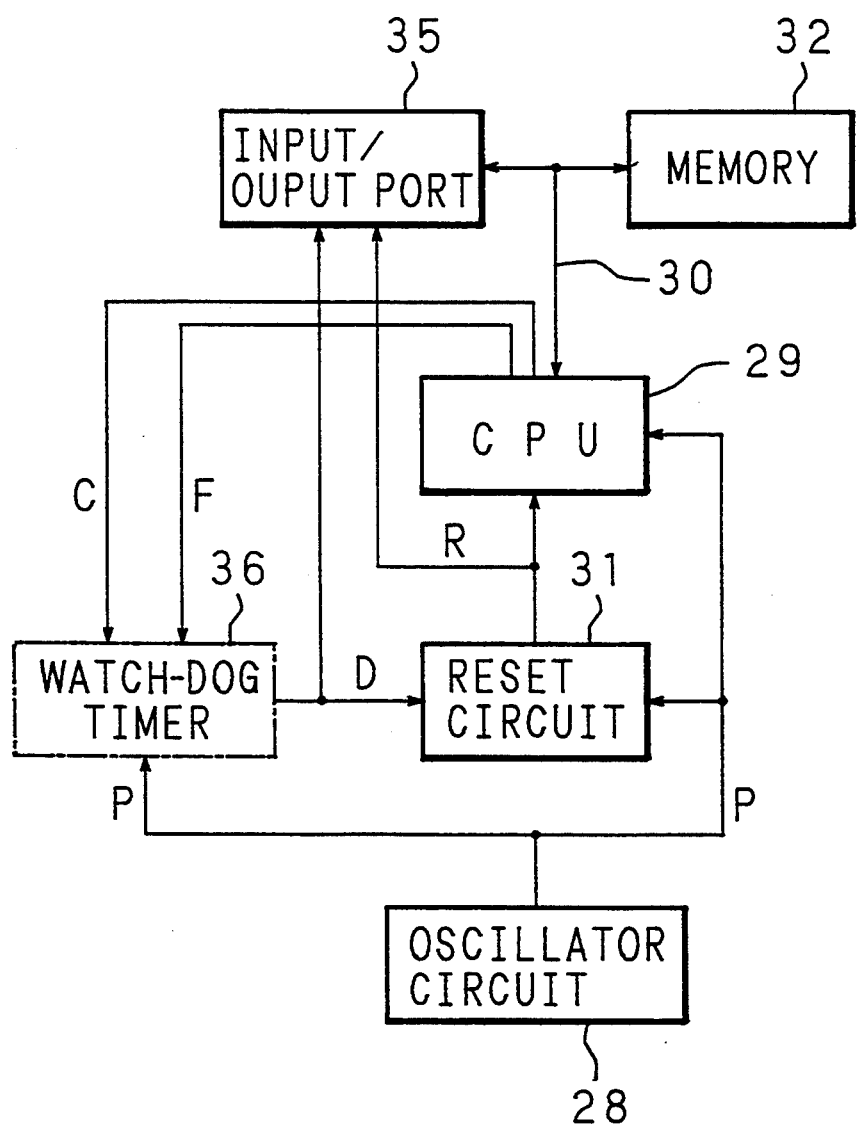
FIG. 2 is a block circuit diagram of the microcomputer provided with the watch-dog timer circuit of the invention.
Figure 3:
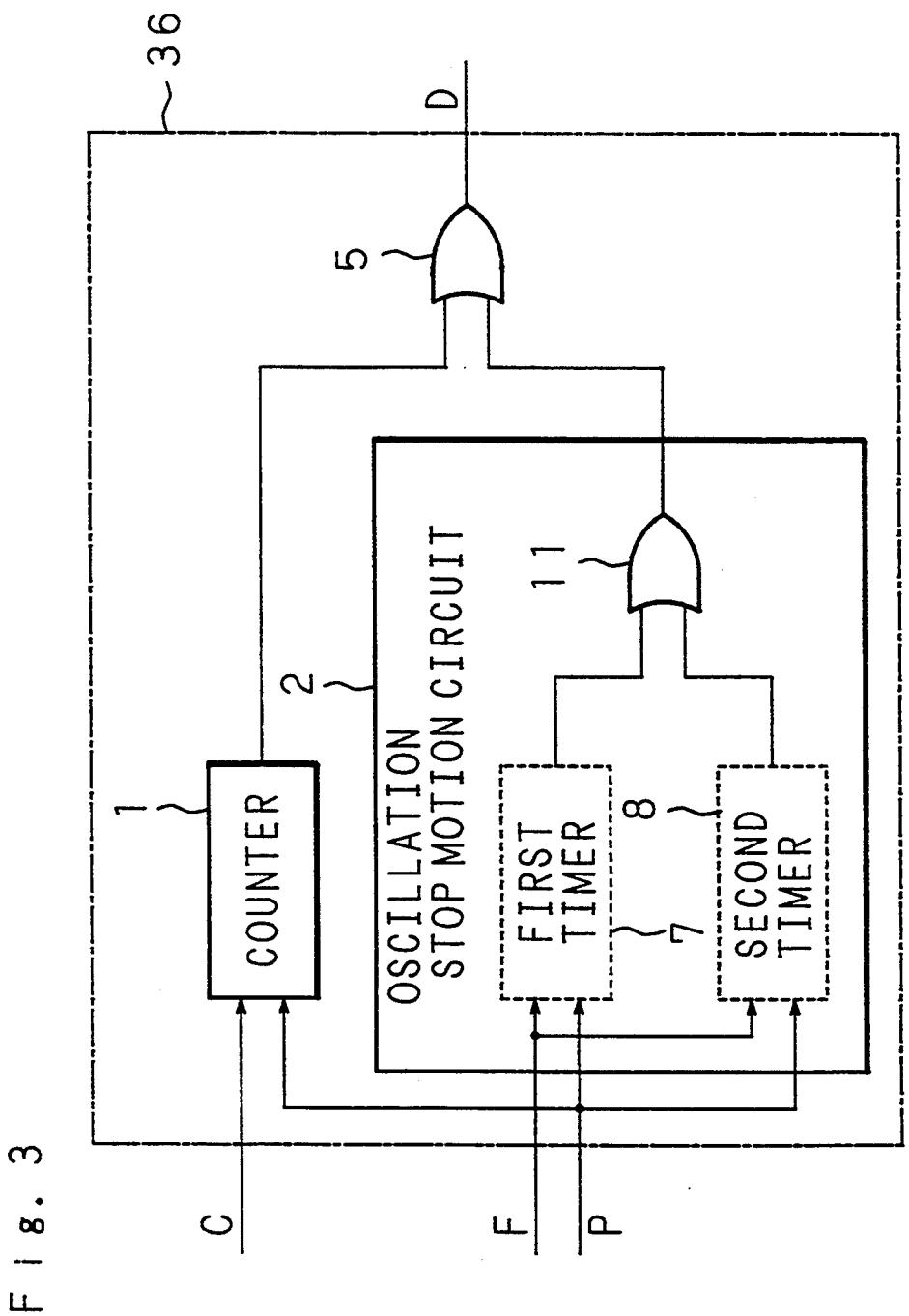
FIG. 3 is an internal block circuit diagram of the watch-dog timer circuit of the invention.

FIG. 2 shows a block circuit diagram illustrative of the constitution of the microcomputer equipped with the watchdog timer circuit of the invention, and FIG. 3 shows an internal block circuit diagram of the watch-dog timer circuit. The microcomputer is equipped with a watch-dog timer 36 incorporated therein which, when a CPU 29 runs out of control due to a certain cause during execution of a program which was read from a memory 32 via a system bus 30, detects the uncontrollable operation of the CPU 29 and outputs a reset request signal D to reset the system to the reset circuit 31. Upon receipt of the reset request signal D, the reset circuit 31 outputs a reset signal R to the CPU 29 and to the input-/output port 35, thereby to reset the CPU 29 and the input/output port 35.

As shown in FIG. 3, the watch-dog timer 36 has an upcogent type counter 1 which counts pulses of a system clock signal P output from an oscillator circuit 28, and is programmed so that a clear signal C is input from the CPU 29 to clear the count before the count of the counter 1 overflows. The watch-dog timer 36 further has an oscillation stop monitor circuit 2 which receives inputs of the system clock signal P and the reset output inhibit signal F to be described later From the CPU 29, and an OR circuit 5 which receives two inputs of watch-dog request signals From the counter 1 and the oscillation stop monitor circuit 2 and outputs the reset request signal D to the reset circuit 31. The oscillation stop monitor circuit 2 has a timer circuit which is refreshed by a pulse of one period of the system clock signal P. The counter 1 may also be of down-count type.

The oscillation stop monitor circuit 2 has a first timer 7 which is refreshed in a period when the system clock signal P is at "H" state, a second timer 8 which is refreshed in a period when the system clock signal P is at "L" state, and an OR circuit 11. The OR circuit 11 is a circuit which, when the system clock signal P stopped in a period of "L" and the first timer 7 is not refreshed again in the next period to become "H", or when the system clock signal P stopped in a period of "H" and the second timer 8 is not refreshed again in the next period to become "L", receives two inputs of detection signals to become "H" and outputs a watch-dog request signal to the OR circuit 5.

Figure 4:
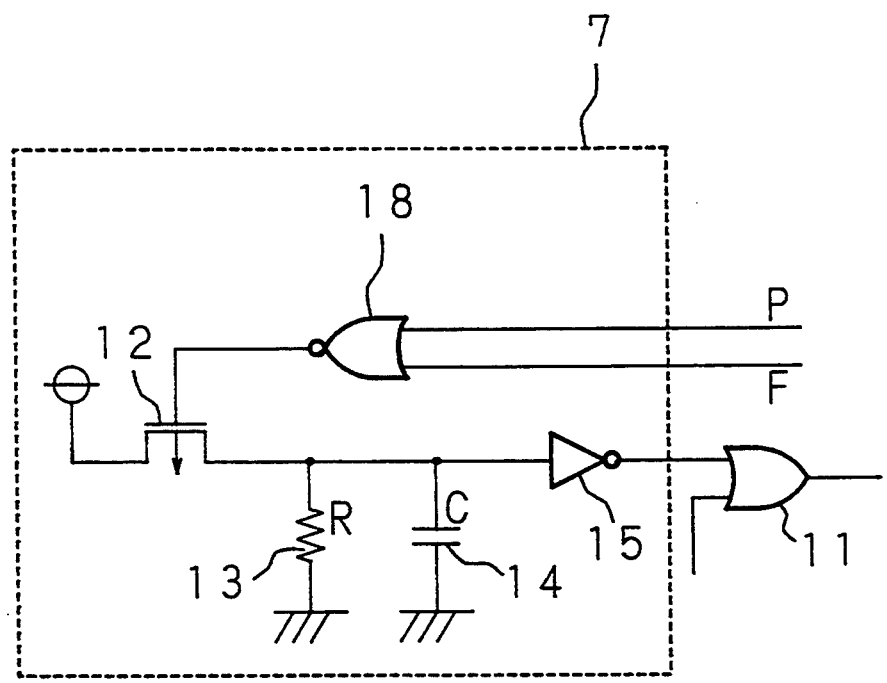
FIG. 4 is an internal block circuit diagram of part of the watch-dog timer circuit., of the invention.

FIG. 4 shows an internal circuit diagram of the first timer 7. The first timer 7 has a NOR circuit 18 which receives the reset output inhibit signal F and the system clock signal P as inputs. The reset output inhibit signal F is a signal which is set to "H" in an operation mode which inhibits system reset even when the oscillator circuit 28 is at a halt such as the low power consumption mode, and is set to "L" in a mode wherein reset of the system is enabled.

The NOR circuit 18 outputs a refresh signal to refresh the first timer 7. A P channel transistor 12 is connected between a power supply and a NOT circuit 15 to be described later, using the refresh signal as the gate input. A resistor 13 and a capacitor 14 are connected on one side thereof between the P channel transistor 12 and the NOT circuit 15, and are grounded on another side thereof. When the system clock signal P does not change from "L" to "H" or from "H" to "L" in a period of time determined by the resistance (R) of the resistor 13 and the capacitance (C) of the capacitor 14, the NOT circuit 15 sets the detection signal to "H" and outputs it to the OR circuit 11.

Circuit construction of the second timer 8 is almost the same as that of the first timer 7, although it differs therefrom in that it outputs an inverted signal of the system clock signal P to the NOR circuit 18.

Operation of the watch-dog timer circuit of the invention made in such a constitution as described above will be described below.

The counter 1 counts up the pulses of the system clock signal P generated by a clock generator circuit (not shown in the drawings) based on the waveform oscillated by the oscillator circuit 28, the count of which being reset by a clear signal C which is output from the CPU 29 at every interval of time determined by a software timer or the like. When the count is not reset, the counter 1 continues counting and outputs an overflow signal indicating the overflow of the count value as a watch-dog request signal for the detection of uncontrollable operation of the CPU 29. In case the counter 1 is of the down-count type, it counts down the pulses of the system clock signal P, and outputs an underflow signal indicating the underflow of the count value as a watch-dog request signal.

On the other hand, when the system clock signal P does not change from "L" to "H" or from "H" to "L", and the first timer 7 or the second timer 8 is not refreshed in a period of the system clock signal P from the falling edge to the rising edge or from the rising edge to the falling edge, the oscillation stop monitor circuit 2 actuates the operation of the first timer 7 to be described later and outputs the watch-dog request signal of oscillation stop detection.

The OR circuit 5 of the watch-dog timer 36 combines these two watch-dog request signals to obtain the logical sum thereof, and sets the reset request, signal D to "H" when either the watch-dog request signal to be output at the time of uncontrollable operation of the CPU 29 or the watch-dog request signal to be output when the oscillator circuit 28 accidentally stops oscillation is input.

Figure 5:
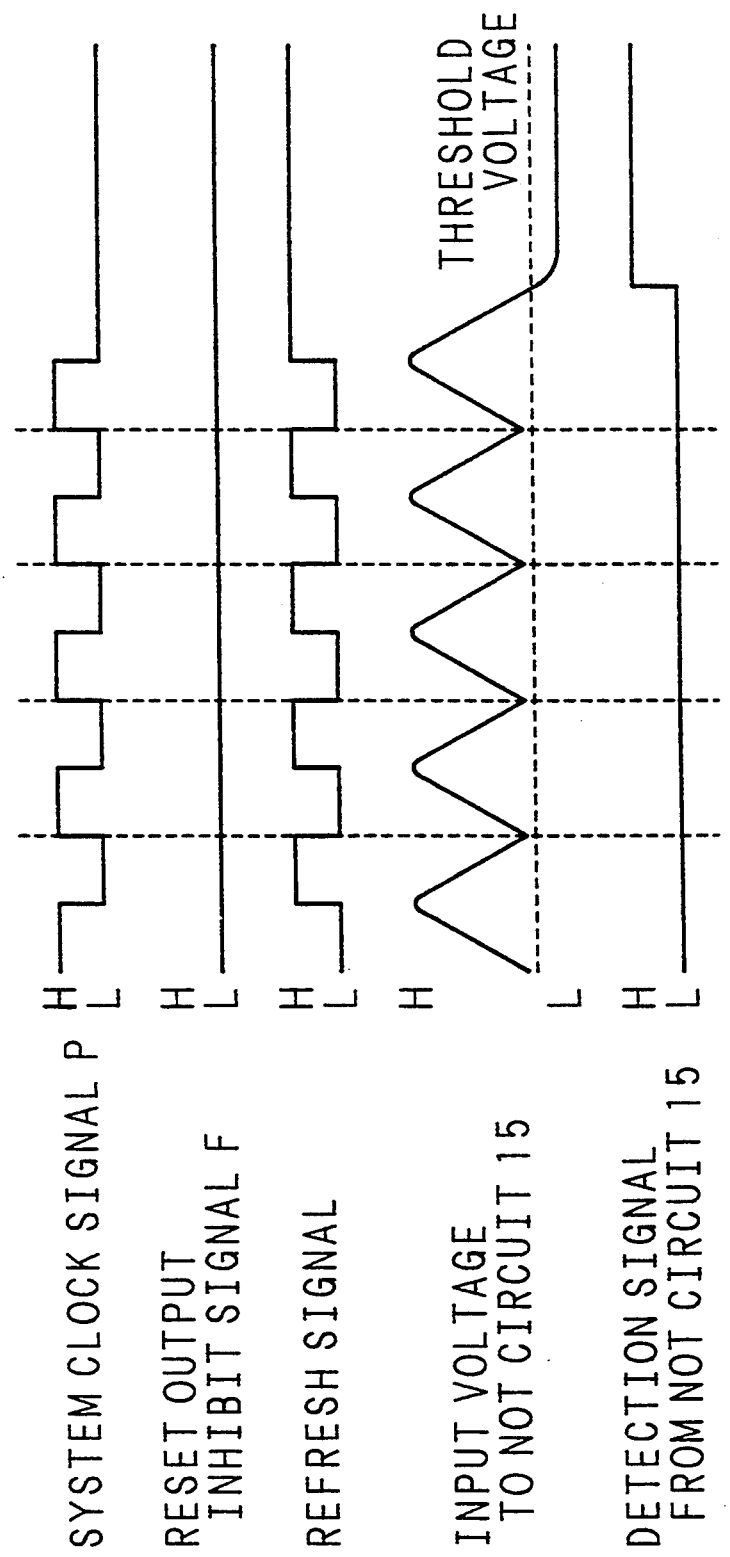
FIG. 5 is a timing chart diagram illustrative of signals in the watch-dog timer circuit of the invention.
Figure 6:
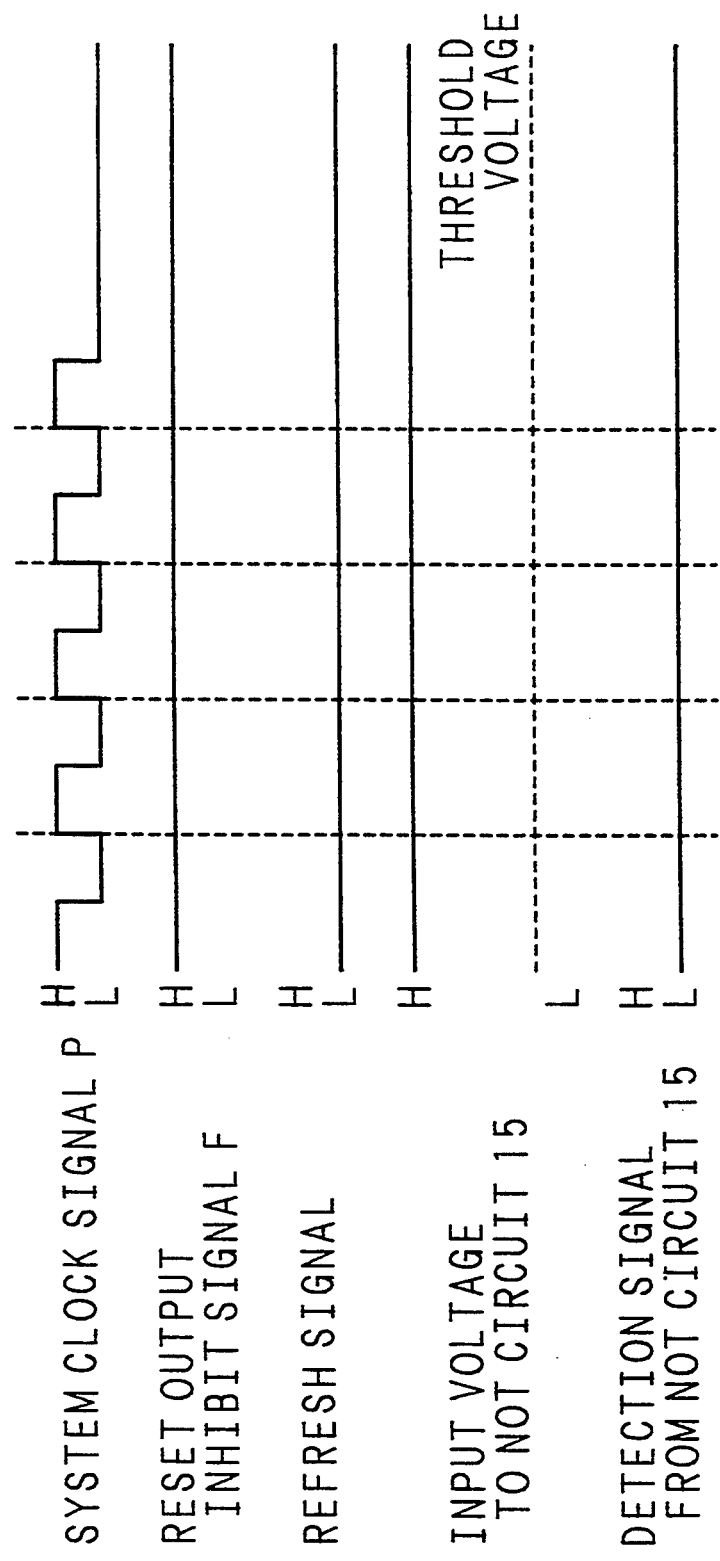
FIG. 6 is a timing chart diagram illustrative of signals in the watch-dog timer circuit of the invention.

Now the operation of the first, timer 7 which is refreshed during a period of the system clock signal P being at "H" state will be described below with reference to FIG. 5 and FIG. 6 illustrative of the timing charts of the signals.

When the function of resetting the system when the oscillator circuit 28 stops oscillation is to be enabled, the reset output inhibit, signal F which is input from the CPU 29 to the first timer 7 is set to "L" as shown in FIG. 5. Consequently, the refresh signal which is output from the NOR circuit 18 when the system clock signal P turns to "H" turns to "L" so that the P channel transistor 12 turns on thereby to charge the capacitor 14.

When the system clock signal P turns to "L" under this condition, the refresh signal turns to "H" to cause the P channel transistor 12 to turn off and the electric charge stored in the capacitor 14 to be discharged through the resistor 13. The NOT circuit 15 monitors the potential of the lines connected to the resistor 13 and to the capacitor 14. When the input voltage decreases below the threshold voltage of the NOT circuit 15, namely when the system clock signal P does not turn to "H" in a period of time determined by the resistance (R) of the resistor 13 and the capacitance (C) of the capacitor 14 and is not refreshed, output of the "H" detection signal is continued. Thus it can be detected that the system clock signal P stopped at the level of L.

The threshold voltage of the NOT circuit 15 is adjusted to a level low enough to determine that the capacitor 14 is still charged even when it is being discharged with the system clock signal P being at "L" under normal condition.

For the resistor 13, ON resistance of a N channel transistor which receives inverted signal of the system clock signal P as the gate input may be used.

On the other hand, in case the oscillation of the system clock signal P Is stopped according to STP command to save the power consumption in such a case as the non-talking period of a portable telephone, it is not needed to assert the system reset signal even when the oscillation has stopped. To disable the reset function as described above, data to disable the function, namely data to set the reset output inhibit signal F to "H" as shown in FIG. 6, is written in a register (not shown in the drawings) or the like of the CPU 29. This makes it possible to always set the refresh signal output from the NOR circuit 18 to "L" regardless of the change in the state, "H" or "L", of the system clock signal P, thereby keeping the detection signal output from the first timer 7 at L.

Operation of the second timer 8 which is refreshed in a period when the system clock signal P is "L" will be described below. Although the operation of the second timer 8 is almost the same as that of the first timer 7, it is different, in that inverted signal of the system clock signal P is input to the NOR circuit 18 and the refresh signal is turned to "L" during a period when the system clock signal P is "L" , thereby to turn the P channel transistor 12 on and refresh the second timer 8. Stop of the system clock signal P in the "H" state can be detected by means of the second timer 8.

As described above, the microcomputer of this embodiment is capable of resetting the system when the CPU 29 runs out of control or when the oscillator circuit 28 accidentally stops oscillation. Even when the oscillator circuit 28 stops oscillation, the system will not, be reset if it is not necessary.

Embodiment 2

Figure 7:
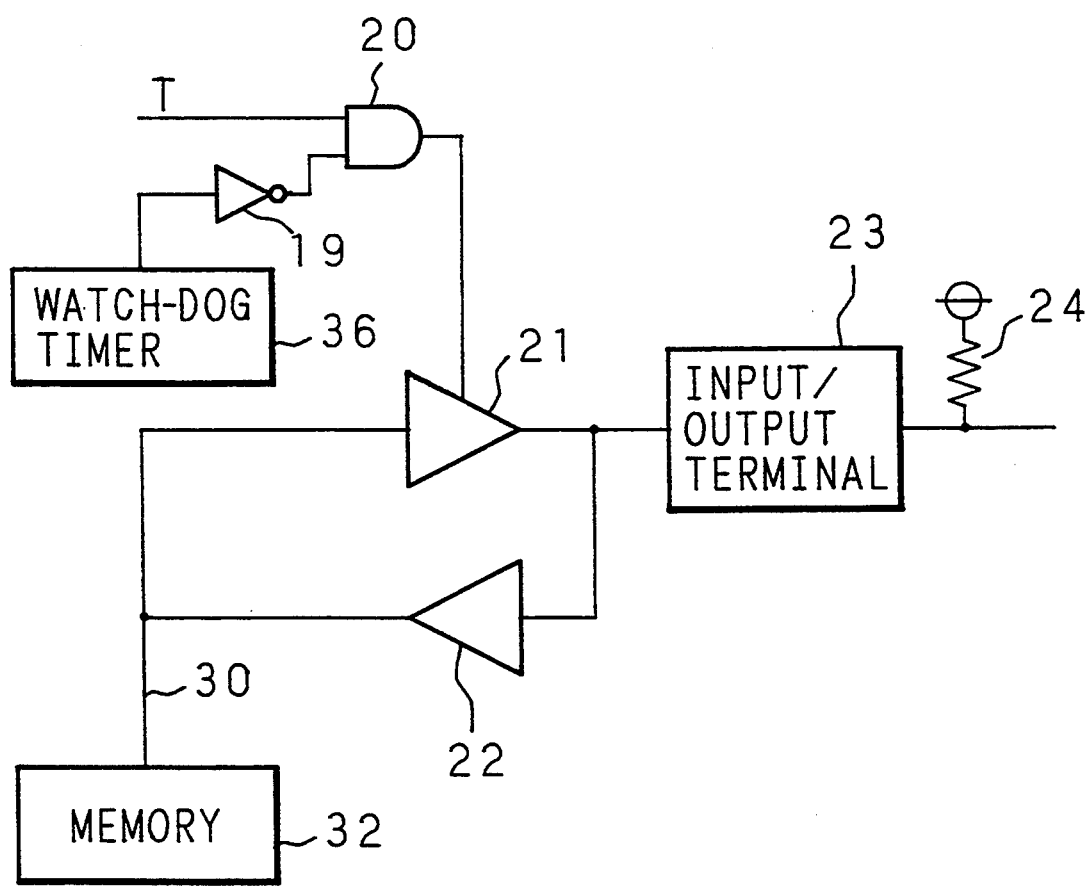
FIG. 7 is a circuit diagram of a key portion in one embodiment of the microcomputer equipped with the watch-dog timer circuit of the invention.

FIG. 7 shows the circuit, diagram of a key portion around the input/output port serving for the data exchange with the outside, of the microcomputer equipped with the watch-dog timer circuit of the first, embodiment described above.

Numeral 21 in FIG. 7 denotes a tri-status output buffer which receives the output data and a control signal from the CPU 29 via the system bus 30 as the inputs. The control signal is the logical product of the reset request signal D from the watch-dog timer 36 described above and inverted by the inverter circuit 19 and an out, put control signal T from an input/output control circuit not shown in the drawing, being combined in the AND circuit, 20. The output control signal T is set to "H" when the input/output port is used as an output port, and set to "L" when it is used as an input port.

Output data from the tri-status output buffer 21 is input to the input/output terminals 23 which are connected to the outside. A pull-up resistor 24 is connected to the input-output terminals 23 on the outside. Input data to the input/output terminals 23 from the outside is first, input to the input buffer 22 and then input to the CPU 29 via the system bus 30.

The operation will now be described below.

When the input/output port is used as an output port, the output control signal T is set to "H" and, as far as the reset request signal D from the watch-dog timer 36 is "L", output data of the CPU 29 is output from the tri-status output buffer 21 to the outside via the input-/output terminals 23.

On the other hand, when the input/output port is used as an input port, the output control signal T is set to "L" thereby to set the control signal to the tri-status output buffer 21 to "L", so that the output of the tri-status output buffer 21 enters the state of floating. Then input data from the outside to the microcomputer is input from the input/output terminals 23 to the input buffer 22 and is taken into the CPU 29 via the system bus 30.

In the case of a-trouble such as uncontrollable operation of the CPU 29 or interruption of the system clock signal P under such a state of data input/output operation as described above, the reset request signal D from the watch-dog timer 36 turns to "H" and therefore the control signal to the tri-status output buffer 21 becomes "L" even when the output control signal T is set to "H", and consequently the output of the tri-status output buffer 21 enters the state of floating so that the output data is not output to the outside. Although gate input floating leak current occurs because the input to the input buffer 22 is put in the floating state, the system can operate without having the gate input floating leak current occurred by pulling up the wiring from the input/output terminals 23 to the out, side by means of the outer resistor 24. Similar effect can be obtained also by connecting a pull-down resistor, or by installing such resistors inside beforehand.

As described above, because the reset request signal D, which has turned to "H" due to the detection of a trouble such as uncontrollable operation of the CPU 29 or stop of the system clock signal P, puts the output from the tri-status output buffer 21 of the input/output port of the microcomputer in the floating state, erroneous data will not be output to the outside and abnormal output is prevented from being output to external systems connected when a trouble occurs in one microcomputer.

Embodiment 3

Figure 8:
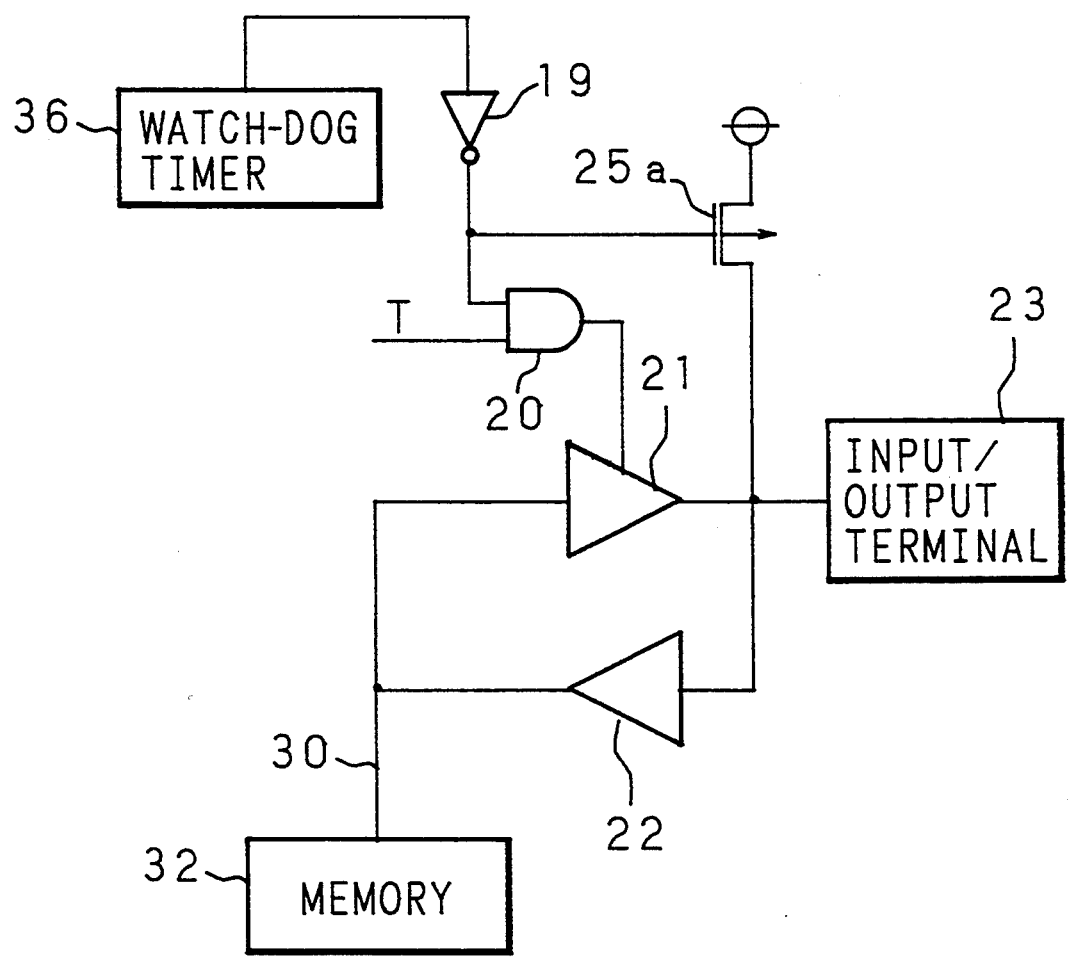
FIG. 8 is a circuit diagram of a key portion in another embodiment of the microcomputer equipped with the watch-dog timer circuit, of the invention.

FIG. 8 shows another embodiment of the microcomputer equipped with the watch-dog timer circuit described in the first embodiment, illustrative of the circuit diagram of a key portion around the input/output port used in data exchange with the outside. Components identical with those in the circuit diagram of FIG. 7 are assigned with the same numerals and the description thereof will be omitted.

In this embodiment, in addition to the constitution of the second embodiment, a P channel transistor 25a which receives a signal inverted from the reset request signal D as the gate input is connected between the power supply and the input/output terminals 23.

Now the operation will be described below.

During use as an output port, similarly to the second embodiment, when the reset request signal D has turned to "H" due to a trouble such as uncontrollable operation of the CPU 29 or stop of the system clock signal P, the control signal to the tri-status output buffer 21 turns to "L" even when the output control signal T which is input to the AND circuit 20 is set to H. Therefore output of the tri-status output buffer 21 enters the state of floating and data will not be output to the outside.

Further in this embodiment, when the reset request signal D which is output from the watch-dog timer 36 turns to "H", the P channel transistor 25a which receives a signal inverted from the reset request signal D as the input turns on so that output of "H" is delivered at the input/output terminals connected to the P channel transistor 25a. Therefore in addition to the inhibition of the data output to the outside, trouble of the microcomputer in question is notified to tile external systems connected to the input/output terminals 23 so that the external systems can execute a process to deal with the trouble.

Embodiment 4

Figure 9:
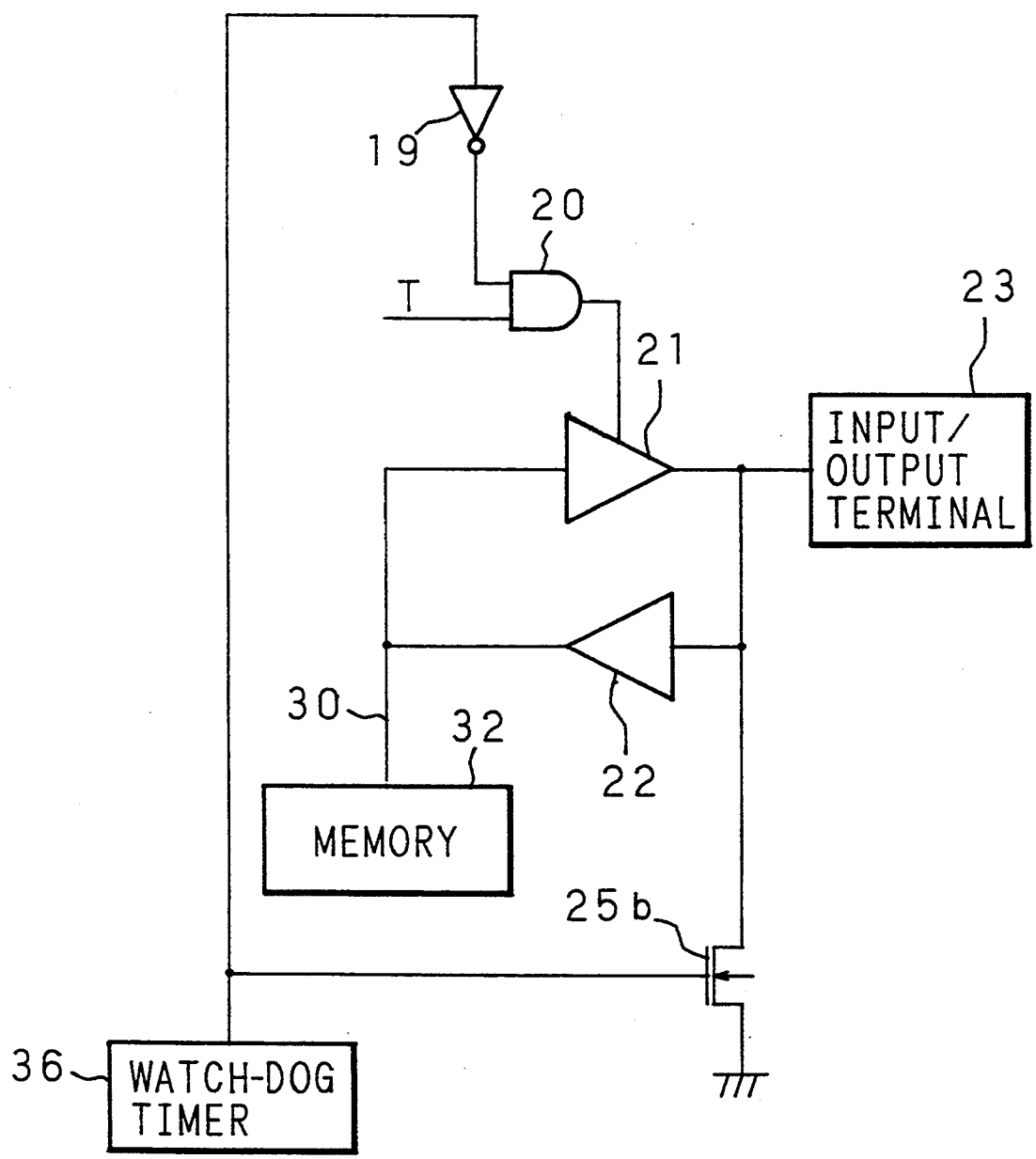
FIG. 9 is a circuit diagram of a key portion in further another embodiment of the microcomputer equipped with the watch-dog timer circuit of the invention.

FIG. 9 shows further another embodiment of the microcomputer equipped with the watch-dog timer circuit described in the first embodiment, illustrative of a key portion of the circuit around the input/output port used in the data exchange with the outside. Components identical with those in the circuit diagram of FIG. 8 are assigned with the same numerals and the description thereof will be omitted.

In this embodiment, instead of the P channel transistor 25a of the third embodiment, an N channel transistor 25b which receives the reset request signal D as the gate input is connected between a GND and the input/output terminals 23 and, when the reset request signal D which is output from the watch-dog timer 36 turns to "H", the N channel transistor 25b turns on so that output of "L" is delivered at the input/output terminals. Therefore, when the reset request signal D turns to "H" due to a trouble such as uncontrollable operation of the CPU 29 or stop of the system clock signal P during use as an output port, the trouble of the microcomputer in question is notified to the external systems connected to the input/output terminals 23, in addition to the inhibition of the data output to the outside, so that the external systems can execute a process to deal with the trouble.

Embodiment 5

Figure 10:
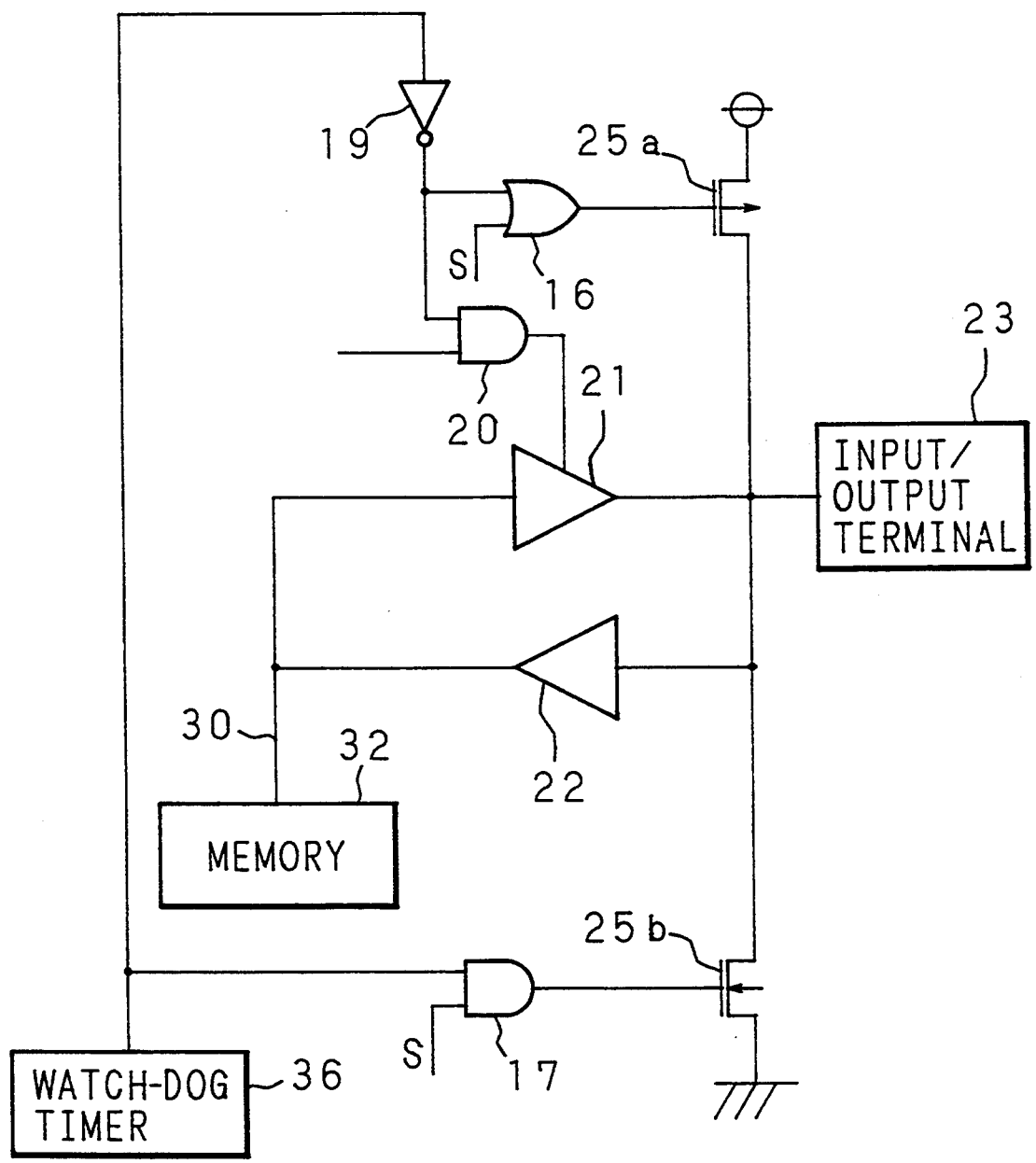
FIG. 10 is a circuit diagram of a key portion in further another embodiment of the microcomputer equipped with the watch-dog timer circuit of the invention.

FIG. 10 shows further another embodiment of the microcomputer equipped with the watch-dog timer circuit described in the first embodiment, illustrative of a key portion of the circuit around the input/output port used in the data exchange with the outside. Components identical with those in the circuit diagrams of FIG. 8 and FIG. 9 are assigned with the same numerals and the description thereof will be omitted.

In this embodiment, both the P channel transistor 25a and the N channel transistor 25b of the third and fourth embodiments are provided. Logical sum is generated by the OR circuit 16 from a signal inverted from the reset request signal D and an output select signal S generated by using a register, mask ROM option or the like, and is sent to the P channel transistor 25a as the gate input, and logical product is generated by the AND circuit 17 from the reset request signal D and the output select signal S, and is sent to the N channel transistor 25b as the gate input.

Now the operation will be described below.

During use as an output port, when the reset request signal D has turned to "H" due to a trouble such as uncontrollable operation of the CPU 29 or stop of the system clock signal P, the P channel transistor 25a turns on so that output of "t" is delivered at the input/output terminals 23, when the output select signal S to the OR circuit 16 and the AND circuit 17 is set to L. When the output select signal S to the OR circuit 16 and the AND circuit 17 is set to "H" , on the other hand, the N channel transistor 25b turns on so that output of "L" is delivered at the input/output terminals 23.

By the operation described above, when a trouble is detected, it is enabled to select the P channel transistor 25a or the N channel transistor 25b, and "H" or "L" can be selectively output to the input/output terminals 23.

Embodiment 6

Figure 11:
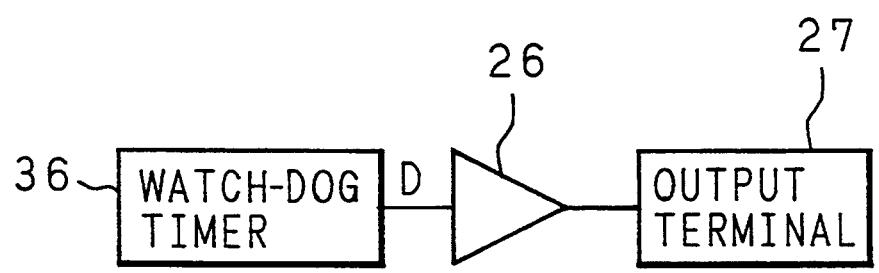
FIG. 11 is a circuit diagram of a key portion in further another embodiment, of the microcomputer equipped with the watch-dog timer circuit of the invention.

FIG. 11 shows a circuit diagram of a key portion of further another embodiment of the microcomputer equipped with the watch-dog timer circuit described in the first embodiment. In FIG. 11, numeral 36 denotes the watch-dog timer described above, which outputs the reset request signal D to the output buffer 26 which in turn outputs the reset request signal D to the dedicated output terminals 27. The output terminals 27 are connected to external systems.

In this embodiment, because the reset request signal D which is output by the watch-dog timer 36 is output from the dedicated output buffer 26 to the dedicated output terminals 27, a trouble of the microcomputer in question can be selectively notified only to the external systems which will be affected, by connecting the external systems which will be affected by the trouble of the microcomputer in question to the dedicated output terminals 27.

As described above, because the watch-dog timer circuit of the invention is capable to determine whether the system clock signal is normally oscillated or not by monitoring the period of the rising edge and falling edge of short period of the system clock signal, in addition to monitoring of the uncontrollable operation of the CPU, such an excellent effect can be obtained as performing tile monitoring function for the system trouble even in the case such as oscillation failure of the oscillator circuit and accidental stop of the oscillation caused by receiving STP command during uncontrollable operation of the CPU.

Also because the microcomputer equipped with the watchdog timer circuit of the invention has a means of, in case of a trouble such as uncontrollable operation of the CPU or oscillation stop, stopping the output to the external devices connected to the microcomputer and further notifying the occurrence of the trouble, it has excellent effects of preventing erroneous output to peripheral devices and external systems and the like and thereby improving the reliability of the system which employs the microcomputer.

As this invention may be embodied in several forms without departing from the spirit of essential characteristics thereof, the present embodiment is therefore illustrative and not, restrictive, since the scope of the invention is defined by the appended claims rather than by the description preceding them, and all changes that fall within metes and bounds of the claims, or equivalence of such metes and bounds "thereof are therefore intended to be embraced by the claims.

What is claimed is:

1. A watch-dog timer circuit, comprising:
a counter for counting clock pulses of a central processing unit, a count of said counter being initialized every time the count reaches a specified value, and when said counter is not initialized, said counter outputting a reset request signal for generating a reset signal of the central processing unit;
a first timer circuit which is refreshed every time after a rear edge of said clock pulse till a next front edge passes, and when said first timer circuit is not refreshed, said first timer circuit outputting the reset request signal for generating said reset signal; and
a second timer circuit which is refreshed every time after a front edge of said clock pulse till a next rear edge passes, and when said second timer circuit is not refreshed, said second timer circuit outputting the reset request signal for generating said reset signal.

2. A watch-dog timer circuit according to claim 1, wherein said first timer circuit inputs a signal to inhibit the generation of said reset signal from said central processing unit and includes first means for not outputting said reset request signal when said first timer circuit is not refreshed within a predetermined period of time, and
said second timer circuit inputs the signal to inhibit the generation of said reset signal from said central processing unit and includes second means for not outputting said reset request signal when said second timer circuit is not refreshed within the predetermined period of time.

3. A microcomputer, comprising:
a watch-dog timer circuit generating a reset request signal to generate a reset signal of a central processing unit;
terminals for outputting data; and
means for causing some or all of the data of said output terminals to be at a floating state when the reset request signal generated by said watch-dog timer circuit is inputted,
wherein said watch-dog timer circuit includes:
a counter for one of incrementing and decrementing a count of clock pulses, said counter being initialized every time the count reaches a specified value, and when said counter is not initialized, said counter generating said reset request signal;
a first timer circuit which is refreshed every time after a rear edge of said clock pulse till a next front edge passes, and when said first timer circuit is not refreshed, said first timer circuit generating the reset request signal; and
a second timer circuit which is refreshed every time after a front edge of said clock pulse till a next rear edge passes, and when said second timer circuit is not refreshed, said second timer circuit generating said reset request signal.

4. A microcomputer according to claim 3, wherein said first timer circuit inputs a signal to inhibit the generation of said reset signal from said central processing unit and includes first means for not outputting said reset request signal when said first timer circuit is not refreshed within a predetermined period of time, and
said second timer circuit inputs the signal to inhibit the generation of said reset signal from said central processing unit and includes second means for not outputting said reset request signal when said second timer circuit is not refreshed within the predetermined period of time.

5. A microcomputer, comprising:
a watch-dog timer circuit generating a reset request signal to generate a reset signal of a central processing unit; and
means for outputting data,
wherein said watch-dog timer circuit includes:
a counter for one of incrementing and decrementing a count of clock pulses, said counter being initialized every time the count reaches a specified values and when said counter is not initialized, said counter generating said reset request signal;

a first timer circuit which is refreshed every time after a falling edge of said clock pulse till a next rising edge passes, and when said first timer circuit is not refreshed, said first timer circuit generating the reset request signal; and a second timer circuit which is refreshed every time after a rising edge of said clock pulse till a next falling edge passes, and when said second timer circuit is not refreshed, said second timer circuit generating said reset request signal, and said output means includes:

a plurality of terminals; and means for locking some or all of said terminals at a high state when the reset request signal generated by said watchdog timer circuit is inputted.

6. A microcomputer according to claim 5, wherein said first timer circuit inputs a signal to inhibit the generation of said reset signal from said central processing unit and includes first means for not outputting said reset request signal when said first timer circuit is not refreshed within a predetermined period of time, and said second timer circuit inputs the signal to inhibit the generation of said reset signal from said central processing unit and includes second means for not outputting said reset request signal when said second timer circuit is not refreshed within the predetermined period of time.

7. A microcomputer, comprising:

a watch-dog timer circuit generating a reset request signal to generate a reset signal of a central processing unit; and means for outputting data, wherein said watch-dog timer circuit includes:

a counter for one of incrementing and decrementing a count of clock pulses, said counter being initialized every time the count reaches a specified value, and when said counter is not initialized, said counter generating said reset request signal;

a first timer circuit which is refreshed every time after a falling edge of said clock pulse till a next rising edge passes, and when said first timer circuit is not refreshed, said first timer circuit generating the reset request signal; and a second timer circuit which is refreshed every time after a rising edge of said clock pulse till a next falling edge passes, and when said second timer circuit is not refreshed, said second timer circuit generating said reset request signal, and said output means includes:

plurality of terminals; and means for locking some or all of said terminals at a low state when the reset request signal generated by said watch-dog timer circuit is inputted.

8. A microcomputer according to claim 7, wherein said first timer circuit inputs a signal to inhibit the generation of said reset signal from said central processing unit and includes first means for not outputting said reset request signal when said first timer circuit is not refreshed within a predetermined period of time, and said second timer circuit inputs the signal to inhibit the generation of said reset signal from said central processing unit and includes second means for not outputting said reset request signal a when said second timer circuit is not refreshed within the predetermined period of time.

9. A microcomputer, comprising:

a watch-dog timer circuit generating a reset request signal to generate a reset signal of a central processing unit; and means for outputting data, wherein said watch-dog timer circuit includes:

a counter for one of incrementing and decrementing a count of clock pulses, said counter being initialized every time the count reaches a specified value, and when said counter is not initialized, said counter generating said reset request signal;

a first timer circuit which is refreshed every time after a falling edge of said clock pulse till a next rising edge passes, and when said first timer circuit is not refreshed, said first timer circuit generating the reset request signal; and a second timer circuit which is refreshed every time after a rising edge of said clock pulse till a next falling edge passes, and when said second timer circuit is not refreshed, said second timer circuit generating said reset request signal, and said output means includes:

means for locking some or all of said terminals selectively at a high or a low state when the reset request signal generated by said watch-dog timer circuit is inputted.

10. A microcomputer according to claim 9, wherein said first timer circuit inputs a signal to inhibit the generation of said reset signal from said central processing unit and includes first means for not outputting said reset request signal when said first timer circuit is not refreshed within a predetermined period of time, and said second timer circuit inputs the signal to inhibit the generation of said reset signal from said central processing unit and includes second means for not outputting said reset request signal when said second timer is not refreshed within the predetermined period of time.

11. A microcomputer, comprising:

a watch-dog timer circuit generating a reset request signal to generate a reset signal of a central processing unit;

a buffer circuit for receiving as an input said reset request signal generated by said watch-dog timer circuit; and terminals for outputting said reset request signal from said buffer circuit to specified external devices, wherein said watch-dog timer circuit includes:

a counter for one of incrementing and decrementing a count of clock pulses, said counter being initialized every time the count reaches a specified value, and when said counter is not initialized, said counter generating said reset request signal;

a first timer circuit which is refreshed every time after a falling edge of said clock pulse till a next rising edge passes, and when said first timer circuit is not refreshed, said first timer circuit generating the reset request signal; and a second timer circuit which is refreshed every time after a rising edge of said clock pulse till a next falling edge passes, and when said second timer circuit is not refreshed, said second timer circuit generating said reset request signal.

12. A microcomputer according to claim 11, wherein said first timer circuit inputs a signal to inhibit the generation of said reset signal from said central processing unit and includes first means for not outputting said reset request signal when said first timer circuit is not within a predetermined period of time, and said second timer circuit inputs the signal to inhibit the generation of said reset signal from said central processing unit and includes second means for not outputting said reset request signal when said second timer is not refreshed within the predetermined period of time.

* * * * *